US006702939B2

(12) United States Patent
Thompson et al.

(10) Patent No.: US 6,702,939 B2
(45) Date of Patent: Mar. 9, 2004

(54) SEWER CLEANING TOOL

(76) Inventors: Ronald L. Thompson, 5621 N. Cannon, Spokane, WA (US) 99205; William R. Peacock, 3414 E. 44th Ave, Spokane, WA (US) 99223

( * ) Notice: Subject to any disclaimer, the term of this patent is extended or adjusted under 35 U.S.C. 154(b) by 137 days.

(21) Appl. No.: 10/097,484

(22) Filed: Mar. 15, 2002

(65) Prior Publication Data

US 2003/0172487 A1 Sep. 18, 2003

(51) Int. Cl.[7] ........................... B01D 35/00; B08B 3/02; B08B 9/04; C02F 1/40

(52) U.S. Cl. ....................... 210/170; 210/188; 210/241; 210/406; 210/416.1; 134/21; 134/22.18; 134/109; 134/167 C; 134/168 C; 15/300.1; 15/300.2; 15/320; 15/322; 15/352; 15/353; 15/414

(58) Field of Search ................................ 210/170, 188, 210/241, 244, 406, 416.1; 134/21, 22.18, 109, 167 C, 168 C, 198; 15/301.1, 302, 315, 320, 321, 322, 340.1, 352, 353, 414

(56) References Cited

U.S. PATENT DOCUMENTS

| | | | | | |
|---|---|---|---|---|---|
| 3,444,581 | A | * | 5/1969 | Daneman | 15/414 |
| 3,600,225 | A | * | 8/1971 | Parmelee | 134/168 C |
| 3,658,589 | A | * | 4/1972 | Shaddock | 134/168 C |
| 4,134,174 | A | * | 1/1979 | Flynn et al. | 15/302 |

* cited by examiner

*Primary Examiner*—David A. Reifsnyder

(57) ABSTRACT

A sewer-cleaning tool includes a sleeve is sized to have an inside diameter incrementally greater than the outside diameter of the pipe. A sleeve is sized to have an inside diameter incrementally greater than the outside diameter of the pipe. A scoop, having a spoon shaped main body, is carried by a lower portion of the sleeve. A fence assembly includes left and right fence segments attached along their lower edges to the scoop and at an upper rear location to the sleeve. A reinforcement assembly includes left and right rods connected to an upper and forward location on the left and right fence segments, respectively, and to the sleeve. In operation, a water hose delivers water upstream of the cleaning tool, causing debris to be washed to the tool and evacuated, while the water moves through the fence assembly, increasing the ratio of debris to water collected.

2 Claims, 5 Drawing Sheets

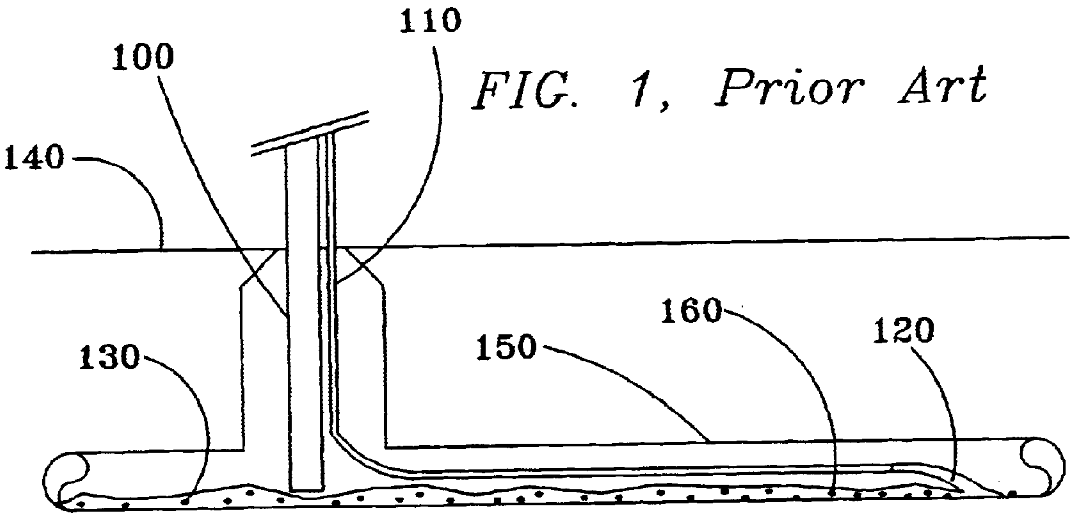
FIG. 1, Prior Art
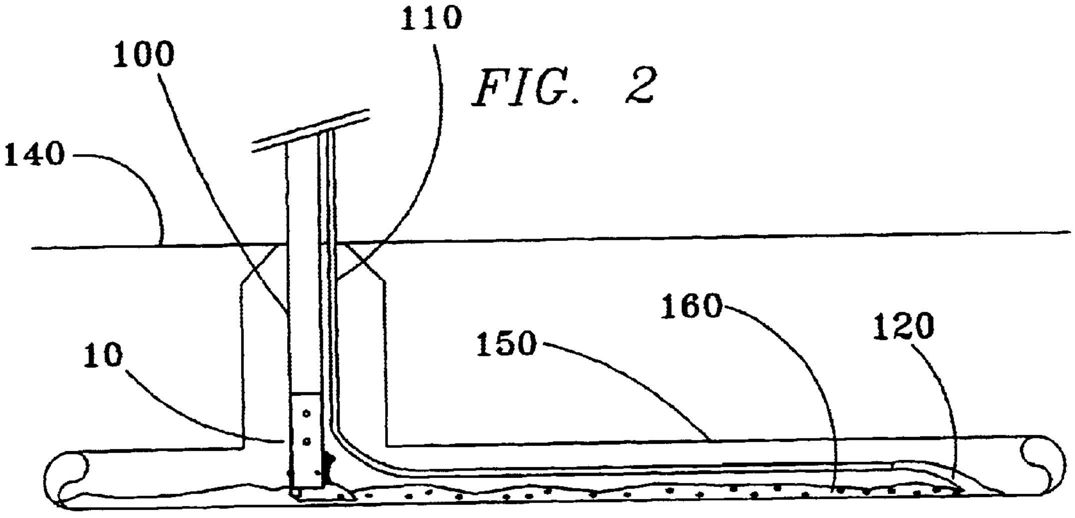
FIG. 2

SEWER CLEANING TOOL

CROSS-REFERENCES

There are no applications related to this application filed in this or any foreign country.

BACKGROUND

Water moving into storm water drainage openings may move debris and other foreign material into the storm water and sewage system. The foreign matter may include leaves and twigs from trees, litter, rocks, dirt, garbage and other undesirable waste. This and other foreign matter may over time accumulate within sewer and storm pipes, catch basins and the like, to the extent that it must be removed to prevent a malfunction of the sewer and storm water drainage system.

As seen in FIG. 1, Prior Art, a typical approach to removing the accumulated foreign material is to use a vacuum machine. Such vacuum machines draw the foreign material from the sewer system into the holding tank of a large truck. Due to the limited space within the tanker truck, the goal is to maximize the amount of foreign material while minimizing the amount of water.

The vacuum equipped tanker truck typically used has a hose terminating in a rigid vacuum pipe segment 100 that is lowered into the storm water pipe 150, sewer pipe or catch basin. The end of the vacuum pipe is positioned near the bottom of the storm water pipe. A high-pressure water hose 110 is snaked into the storm water pipe. Water 120 released from the hose dislodges debris 160 on the bottom of the storm water pipe. A mixture of dislodged debris and water is then vacuumed into the vacuum pipe and stored in the tanker truck. Unfortunately, due to the design of known vacuum pipe segments, several problems result.

A first problem is that a substantial quantity of pass-by debris 130 passes the vacuum pipe as it moves down the storm water pipe under the influence of the water released from the hose. This debris is therefore simply relocated within the sewer and storm water pipe.

A second problem is that too much water and too little debris is vacuumed, and tanker trucks quickly become filled in this manner without contributing significantly to the problem of debris removal.

In view of this result, what is needed is a sewer-cleaning tool, which increases the amount of debris removed, while minimizes the amount of water removed from a storm water line, sewer line or catch basin. The sewer-cleaning tool must be readily adapted for installation on the vacuum pipe segment present on existing vacuum equipped tanker trucks, and must be easily installed and removed.

SUMMARY

The present invention is directed to an apparatus that satisfies the above needs. A novel sewer-cleaning tool is easily installed on, and removed from, the tube segment present on existing vacuum equipped tanker trucks. During a cleaning process, the sewer-cleaning tool increases the amount of debris, and minimizes the amount of water, removed from a storm water line, sewer line or catch basin.

A preferred sewer-cleaning tool of the present invention provides some or all of the following structures.

(A) A sleeve 20 has an inside diameter sized incrementally greater than the outside diameter of a pipe 100, and therefore may be installed over the end of the pipe. The sleeve defines left, right and rear adjustment slots that allow attachment to the pipe 100 that allows the tool to be adjusted to the amount of flow within the storm water line, or combined storm and sanitary lines, or sanitary sewer lines by bolts or similar fasteners. The sleeve also defines bolts holes that allow one of two different industry standard quick couplers to be connected, thereby allowing for rapid installation and removal of the tool from the existing tubes found on all existing vacuum equipped tanker trucks. The adjustments slots are oriented vertically, thereby allowing the sleeve to be slid up or down on the pipe to select a position which maximizes removal of debris, while minimizing water removal by allowing the distance between the main body 42 of the scoop 40 and the lower rim 110 of the pipe 100 to be changed. By regulating the adjustment slots in this manner, compensation may be made for the relative quantities of debris and water, as well as for the nature of the debris.

(B) A rounded rear wall 46 of the scoop 40 is attached to a lower rim 28 of the sleeve. This wall hydraulically directs both the suction from the vacuum tanker truck and the horizontal flow of debris and water in uniform patterns, which allows for single direction suction.

(C) The somewhat spoon-shaped main body 42 of the scoop catches debris and directs it rearward. The main body conforms to the circular shape of the pipes it is being used to clean. As a result, debris passes over an upper surface of the main body, while the lower surface of the main body prevents water flow beneath it, by fitting tightly against the bottom of the pipe being cleaned.

(D) A fence assembly 60 includes left and right segments. Each segment is welded along a lower edge to the left and right edges of the main body of the scoop, respectively. Additionally, the fence segments may be welded along a rear edge to a rear portion of the outer surface of the sleeve. The left and right fence segments allow water to pass, yet traps and redirects debris toward the debris inlet 34, defined between the main body of the scoop and the lower rim of the pipe 100.

(E) A reinforcement and adjustment assembly 80 includes left and right rods, each attached at a first end to an ear carried by an upper edge of each fence segment 60 and at a second end to a front side wall of the sleeve. Together, the rods prevent debris and the water moving the debris from bending the left and right fence segments. The adjustment portion of the rods allows the fence to have minor adjustments made to reflect the different pipe channels irregularities within the pipes being cleaned.

It is therefore a primary advantage of the present invention is to provide a novel sewer-cleaning tool for attachment to a suction tube extending from a mobile vacuum cleaning machine that includes an adjustable fence assembly having left and right fence segments which guide debris into an opening of the tube to which the sewer-cleaning tool is attached, but which allows water to pass through, thereby increasing the debris collected by the vacuum cleaning machine, while minimizing the water collected.

Another advantage of the present invention is to provide a novel sewer-cleaning tool for attachment to a suction tube extending from a mobile vacuum cleaning machine that allow vertical adjustment of a sleeve portion with respect to the pipe to which it is attached, thereby allowing the distance from a scoop portion of the sewer-cleaning tool to the pipe opening to be controlled. This allows the sewer-cleaning tool to be used in a variety of flow and debris conditions.

Another advantage of the present invention is to provide a novel sewer-cleaning tool for attachment to a suction tube extending from a mobile vacuum cleaning machine that provides a scoop having a generally spoon-shaped main body that conforms to the typical circular pipes bottom, that guides debris toward the opening of the tube to which the sewer-cleaning tool is connected.

Another advantage of the present invention is to provide a novel sewer-cleaning tool for attachment to a mobile vacuum cleaning tanker truck that provides a scoop that traps material too heavy for the vacuum portion of the mobile vacuum cleaning tanker truck to remove, and allows for removal of heavy debris by using a hydraulic tube lift mechanism associated with the mobile vacuum cleaning tanker truck.

A still further advantage of the present invention is to provide a novel sewer-cleaning tool that allows and draws water and debris from only one direction, thereby eliminating the inefficient removal of water from the downstream direction.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

FIG. 1, PRIOR ART is a cross-sectional view illustrating the current technology and the problem addressed by the version of the sewer-cleaning tool disclosed.

FIG. 2 illustrates a cross-sectional view of a sewer, and a version of the sewer-cleaning tool in use.

DESCRIPTION

Figure 3:
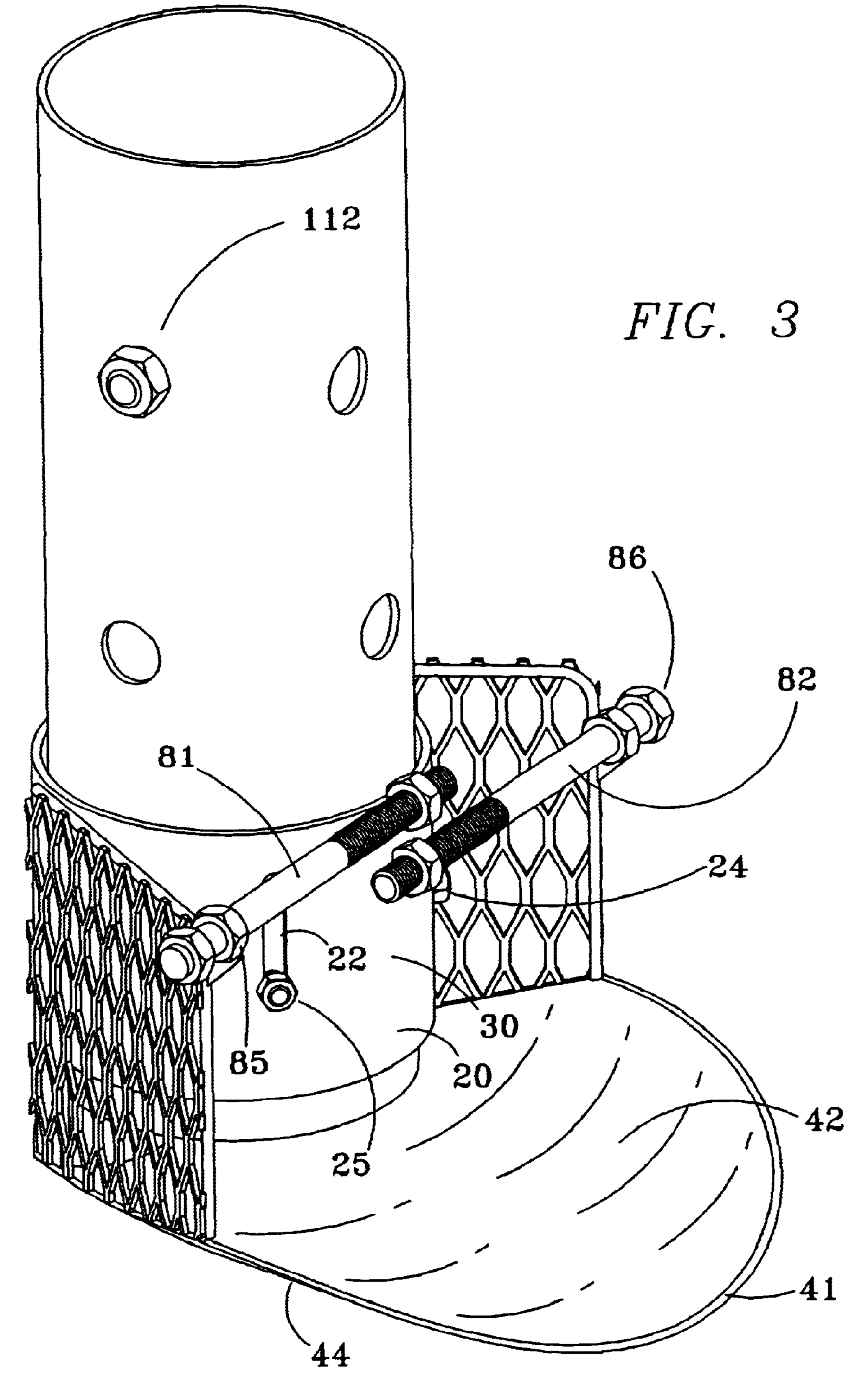
FIG. 3 is a perspective view of the version of the sewer-cleaning tool of FIG. 2, attached to a vacuum pipe extending from a mobile vacuum machine.

Referring in generally to FIGS. 2 through 6, a sewer-cleaning tool 10 includes a vacuum tube adapter section 100, which allows connection to the vacuum tube 11 extending from a mobile vacuum-cleaning machine constructed in accordance with the principles of the invention is seen. A sleeve 20 is sized to have an inside diameter incrementally greater than the outside diameter of the pipe 100. Adjustment slots defined in the sleeve allow it to be moved along the pipe to a desired location and then connected to the pipe in a rigid manner. Connection holes allow the adapter sleeve to be quickly connected to one of two standard quick couplers found on all mobile vacuum-cleaning machines. A scoop 40, having a main body that is generally spoon shaped, is carried by a lower portion of the sleeve. A fence assembly 60 includes left and right fence segments. In a preferred method of assembly, the fence segments are welded along their lower edges to the left and right side edges of the scoop. The fence segments are additionally welded to the sleeve along a rear edge or spot welded to the sleeve at an upper rear location of each fence segment. A reinforcement and adjustment assembly 80 includes left and right adjusting rods connected to a second upper location on the left and right fence segments, respectively.

In operation, the connection between the sewer-cleaning tool 10 and the end of a tube 100 is adjusted to result in the desired distance between the lower rim of the pipe and the main body of the scoop 40. The cleaning tool is lowered to the bottom of a storm or sewer pipeline. A high-pressure water hose delivers water under high pressure to a jet nozzle upstream of the cleaning tool, dislodging and washing debris toward the tool. The fence segments guide debris carried by water into the scoop and up the pipe via the vacuum. A substantial quantity of water passes through the fence, thereby increasing the ratio of debris to water collected. The sewer-cleaning tool prevents removal of water from the down stream direction, thereby increasing overall efficiency.

The sewer-cleaning tool is adapted for installation on the standard vacuum cleaning machine by use of the connector tube 100 which is the same size as those carried by a vacuum cleaning truck. Such pipes are known in the prior art, and are generally standardized in construction. A typical adapter vacuum tube 100 is open at a lower rim 110 to allow entrance of debris and water, such as that typically used to remove debris from a storm drain manhole or catch basin. An outside diameter of 8" is typical, resulting in a sleeve having an inside diameter of incrementally greater than 8". In the method of operation known in the prior art, the tube would be lowered into the storm or sewer line. A partial vacuum generated by the mobile vacuum-cleaning machine would draw a mixture of solid debris and water up the tube. Due to the construction and design of the tube, the mixture would contain an excessively high quantity of water in relation to the debris collected.

An upper portion of the tube 100 carries a standardized coupler, to which the vacuum tube of a mobile vacuum unit could be attached. The coupler is held on the upper portion of the tube by four sets of ⅜" bolts 112 with washers and nylon locking nuts, distributed at 90-degree intervals about an upper portion of the pipe.

Air holes 102 are typically 1.215" in diameter and distributed at 90-degree intervals around the pipe, which allows the lifting ability to exceed the level that would otherwise result.

Figure 6:
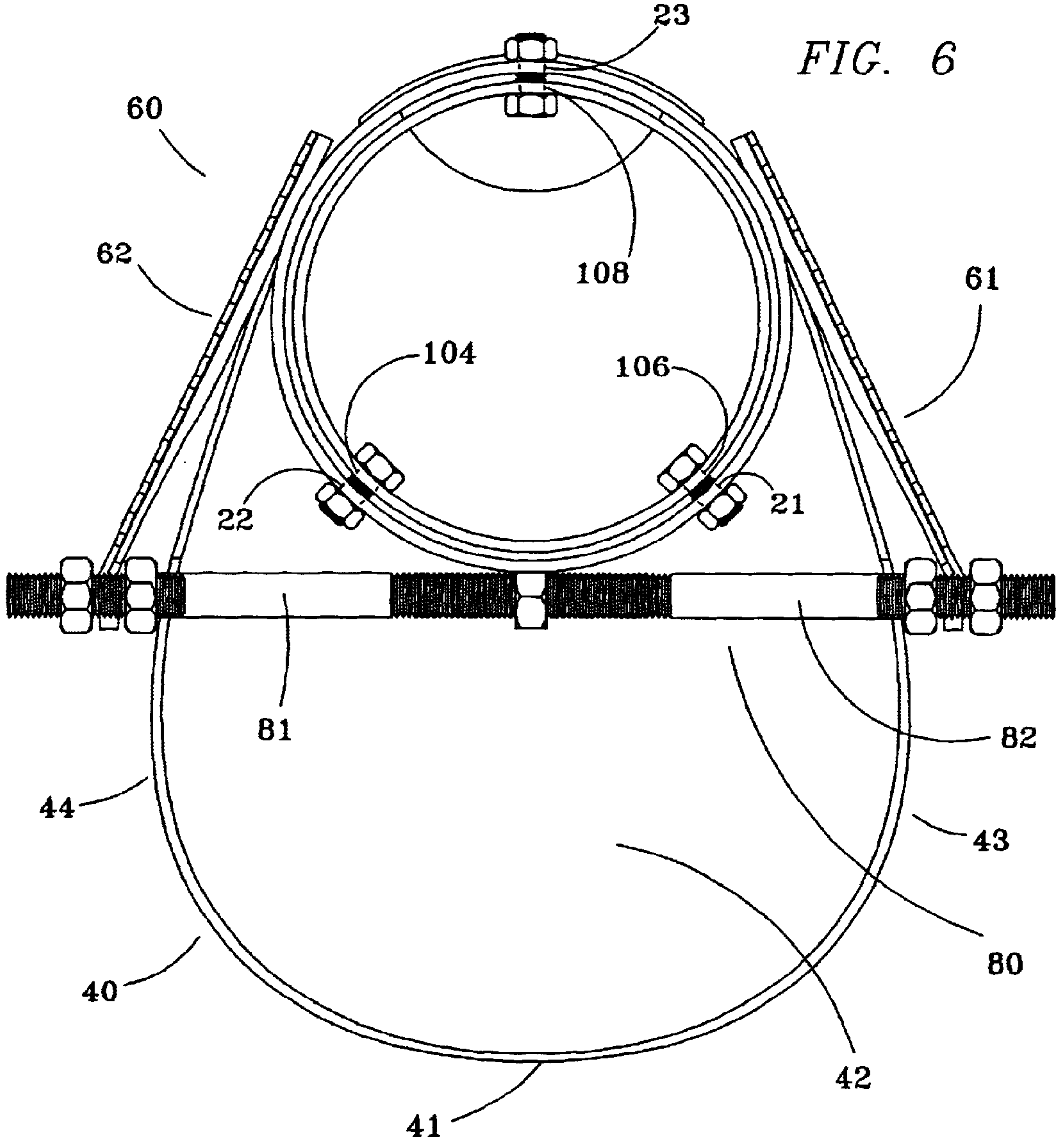
FIG. 6 is an isometric cross-sectional view of the sewer-cleaning tool, taken along the 6—6 lines of FIG. 4.

To adapt the tube so that the sleeve may be installed, the tube is typically drilled in three locations to form three boltholes to allow attachment of the sleeve 20. Left, right and rear bolt holes 104, 106, 108 are best seen in FIG. 6. The boltholes allow attachment to corresponding left, right and rear adjustment slots 21,22,23 defined in the sleeve 20. Alternatively, four or more bolts or other fasteners could be used.

Figure 4:
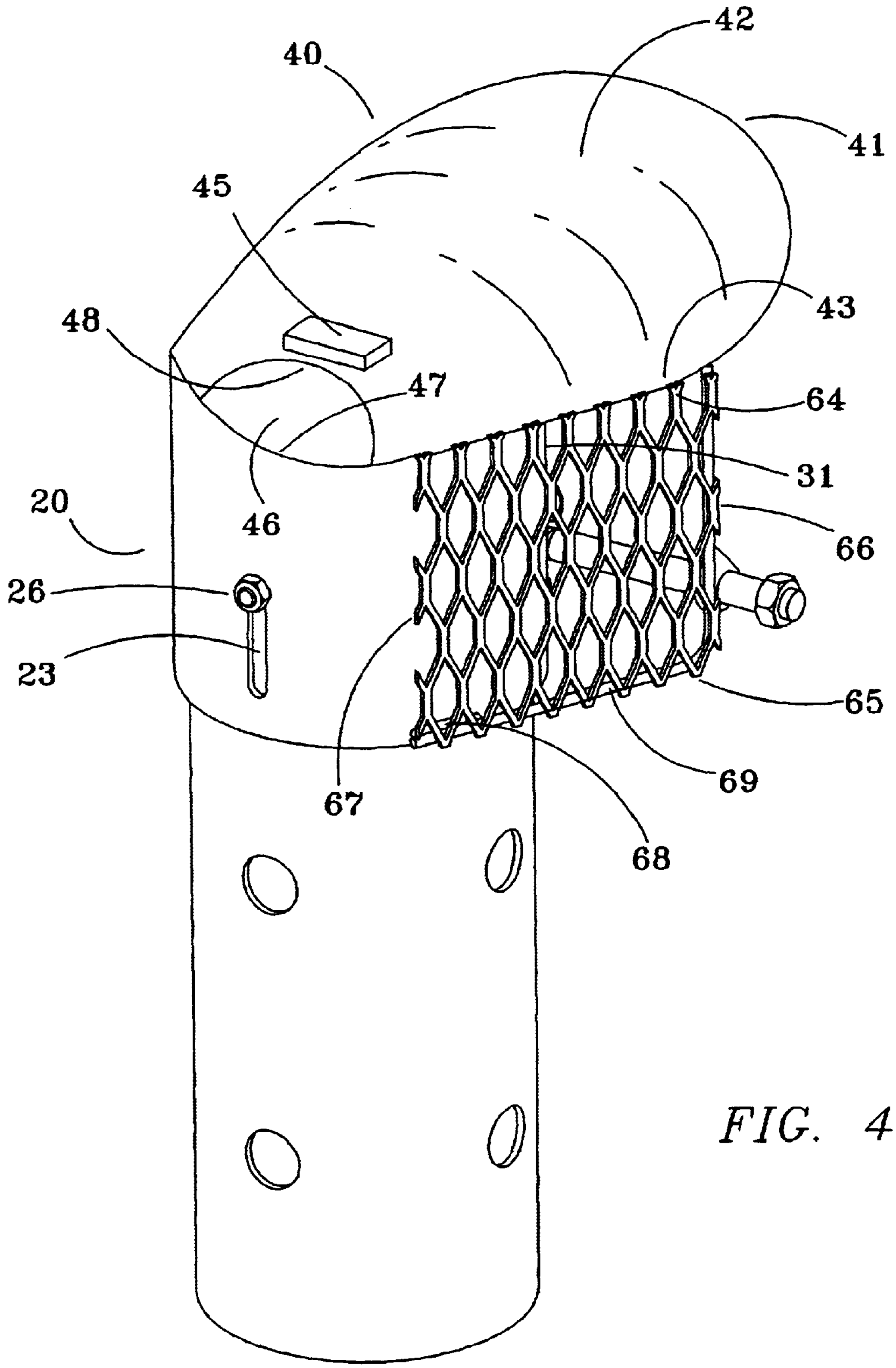
FIG. 4 is a perspective view of the sewer-cleaning tool of FIG. 3, inverted to show the structure of the bottom of the sewer-cleaning tool.
Figure 5:
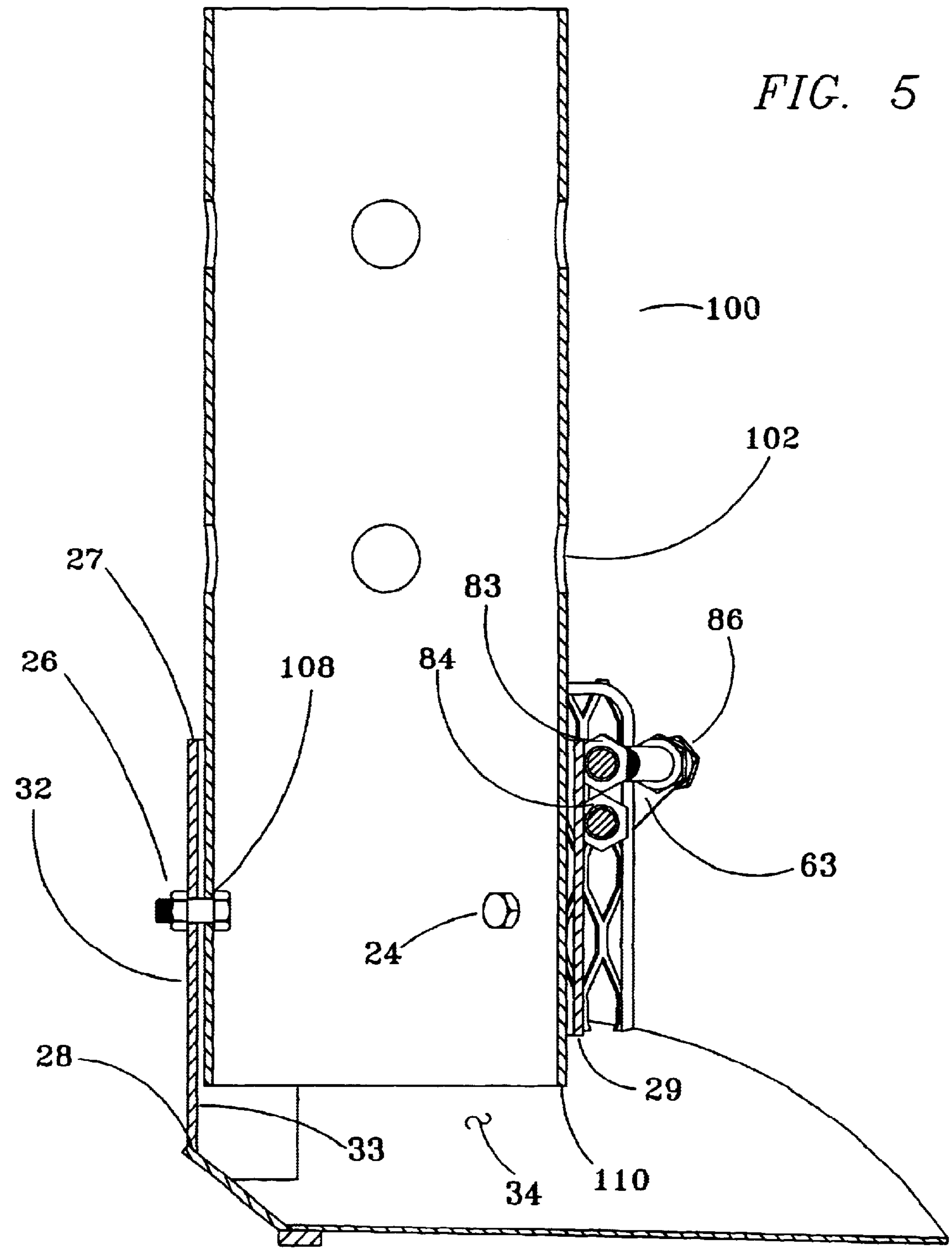
FIG. 5 is an isometric cross-sectional view of the skimmer, taken along the 5—5 lines of FIG. 3.

As seen particularly in FIGS. 3, 4 and 5, a preferred sleeve 20 is sized to slide over a lower portion of the adapter tube 100. In particular, the sleeve has an inside diameter sized incrementally greater than the outside diameter of the tube 100, and therefore may be installed over the end of the lower end of the tube. As seen particularly in FIG. 5, a preferred sleeve includes an upper full cylinder 32 and a lower half cylinder 33. A debris inlet 34 allows debris and water to enter.

A preferred sleeve has a length along its axis of 12 inches, between an upper rim 27 and a lower rim 28. The length of a forward portion of the sleeve, between the upper rim 27 and the front lower rim 29 is approximately 7.5 inches.

The sleeve defines left, right and rear adjustment slots 21, 22, 23 allow attachment to the holes 104, 106, 108 defined in the tube by bolts 24,25,26 or similar fasteners. The slots are oriented vertically, thereby allowing the sleeve to be slid on the tube prior to tightening the fasteners. As a result, the adjustment slots allow the distance between the main body 42 of the scoop 40 and the lower rim 110 of the pipe 100 to be selected. A greater distance results in a larger debris inlet 34, which will allow debris of greater size to enter the tube 100, but also tens to result in additional water entering the tube. Therefore, the distance is generally selected to result in sufficient clearance for the debris to be removed, without excessive clearance that would result in the pick up of excessive amounts of water.

As is best seen in FIGS. 3, 4, 5 and 6, a generally spoon-shaped scoop 40 is carried by the lower rim 28 of the sleeve 20 and lower edges 64 of the left and right segments 61, 62 of the fence assemble 60. A preferred scoop includes a generally spoon-shaped main body 42 and a sloping radial rear wall 46. The spoon-shaped main body tends to collect, gather and transport debris toward the opening defined by the lower rim 110 of the tube 100. Moreover, the bottom surface of the spoon-shaped main body has a curvature similar to that of the inside surface of a sewer or storm drainpipe, and therefore fits against the bottom of such a pipe, thereby preventing debris from passing under the scoop. The sloping radial rear wall 46 smoothly directs debris inward and upward with the least loss of energy into the tube 100.

The dimensions of the scoop are variable which depending on the size of the storm or sewer pipe to be cleaned, and while a number of alternative dimensions would result in some of the same advantages, the preferred embodiment is illustrated. The preferred scoop is approximately 19 inches at its widest extent. At is narrowest, the scoop is approximately 7.5 inches wide, when measured between the intersection of the scoop and the lower and rear edges 64, 67 of the left and right fence segments 61,62.

The front edge 41 of the scoop is a generally rounded shape that resists snagging on pipes, debris or other structures with which it comes into contact. The center portion of the front edge is 9.5 inches forward of the sleeve, i.e. 9.5 inches to the right of the edge of the sleeve in the view of FIG. 5.

Left and right side edges 43, 44, of the scoop are generally straight, and are welded to the lower edges 64 of the left and right fence segments, respectively.

The radial sloping rear wall 46 is welded to, or formed continuously with, the rear edge 48 of the main body of the scoop. The rear edge 47 of the rear wall is welded or otherwise attached to the lower rim 28 of the sleeve 20.

As seen in FIG. 4, in a preferred version of the invention, a heal plate 45 is carried by the lower surface of the scoop. The heal plate provides a flat, stabile surface upon which to support the sewer-cleaning tool 10, and tends to angle the scoop to allow the leading edge to make contact and seal between the pipe to be cleaned and the scoop.

As seen in FIGS. 3 and 4, a fence assembly 60 includes left and right segments 61, 62, each made of a screen or mesh sheet. The fence assembly gathers and directs debris into the opening defined by the rim 110 of the adapter tube 100, while allowing water to pass through. As a result, the amount of debris gathered is maximized and the amount of water collected is minimized.

Each fence segment includes a lower edge 64 that is welded or otherwise attached to either the left or right side edge 43, 44 of the scoop. A rear edge 67 of each fence segment may be welded or otherwise attached to the sleeve 20. Upper and front edges 65,66 of each fence segment are welded to a reinforcing trim 69 that provides adjustment and additional rigidity to the fence assembly. Such rigidity is particularly helpful where heavy debris and fast-moving water is encountered.

In the version of the invention seen in FIG. 4, the corner of each fence segment formed in the area of intersection of the upper edge 65 and rear edge 67 is attached to the sleeve 20. As seen in FIG. 4, and upper weld 68 bonds the upper rear portion of the fence segment, the rear end of the trim 69 and an upper location of the sleeve together. Alternatively, the entire rear edge 67 could be welded to the sleeve.

An attachment ear 63 is carried at an upper and forward location on each fence segment, and is located at the intersection of the upper and front edges 65, 66 where the trim is bent at a approximately 90 degree angle. The attachment ear is typically welded to the corner of the fence segment and to the trim. Each reinforcement ear defines a hole through which the left or right rod 81, 82 or the adjustment assembly passes. The reinforcement assembly passes. The reinforcement assembly is thereby able to prevent debris from deforming the fence segments during operation and adjusts the fence to meet variable storm or sewer pipe irregularities.

A reinforcement assembly 80 includes left and right rods 81, 82. Each rod is attached at a first end to an attachment ear 63 carried by an upper edge of each fence segment and at a second end to a front sidewall 30 of the sleeve. Together, the rods prevent debris and the water moving the debris from bending back the left and right fence segments.

As seen in FIG. 3, upper and lower center nuts 83, 84 are attached to the front sidewall 30 of the sleeve, typically by a welded connection. An inner end of left and right rods 81, 82 is each treaded into one of the center nuts. In a preferred embodiment, a threaded portion on the outer end of each rod carries a pair of nuts 85, 86, one on each side of the attachment ear 63. Alternatively, the end of the rod could be welded to the fence segment.

Due to the hostile environment in which the sewer-cleaning tool is used, in a typical application all parts are made of metal, typically stainless steel or aluminum.

In use, a known type of mobile vacuum cleaning machine is moved to a location on the pavement 140 above the storm water pipe 150 at the work site. The sewer-cleaning tool 10 along with its adapter tube 100 is attached to the vacuum tube extending from the cleaning machine. The sleeve is slid up or down, as desired, with the fasteners sliding in the slots 21, 22, 23. When the distance between the lower rim 110 of the tube and the main body 42 of the scoop is correct, the fasteners are tightened. The distance should be determined by experience, typically taking into account the nature of the debris to be collected and the speed and depth of the water in which it is carried. The goal is to set the distance to a span that will maximize the amount of debris collected and to minimize the amount of water collected. Where the size of the debris is anticipated to be smaller, the sleeve may be raised to lessen the distance between the scoop and the opening defined by the rim 110 of the tube 100.

The scoop 40 of the sewer-cleaning tool is positioned on the bottom of the storms or sewer pipe, with the open end of the scoop oriented toward the upstream direction.

A high-pressure water hose 110 is used to release a stream of high-pressure water via a nozzle 120 upstream of the cleaning tool 10. The water will flow under gravity toward the cleaning tool, and will carry with it the debris 160 it has dislodged toward the sewer-cleaning tool 10. The debris and some water is evacuated by the suction of the sewer-cleaning tool, while most of the water passes through the fence assembly 60, and moves down the pipe.

Typically, the high-pressure water hose and nozzle are first extended only somewhat upstream of the cleaning tool 10, thereby cleaning the area between the end of the water hose and nozzle and the tool. Once this is clean, the high-pressure water hose and nozzle are extended further, thereby cleaning additional sections of the pipe.

The previously described versions of the present invention have many advantages, including a primary advantage of providing a novel sewer-cleaning tool for attachment to a suction tube extending from a mobile vacuum cleaning machine that includes an adjustable fence assembly having left and right fence segments which guide debris into an opening of the tube to which the sewer-cleaning tool is attached, but which allows water to pass through, thereby increasing the debris collected by the vacuum cleaning machine, while minimizing the water collected.

Another advantage of the present invention is to provide a novel sewer-cleaning tool for attachment to a suction tube extending from a mobile vacuum cleaning machine that allow vertical adjustment of a sleeve portion with respect to the pipe to which it is attached, thereby allowing the distance from a scoop portion of the sewer-cleaning tool to the pipe opening to be controlled. This allows the sewer-cleaning tool to be used in a variety of flow and debris conditions.

Another advantage of the present invention is to provide a novel sewer-cleaning tool for attachment to a suction tube extending from a mobile vacuum cleaning machine that provides a scoop having a generally spoon-shaped main body that conforms to the typical circular pipes bottom, that guides debris toward the opening of the tube to which the sewer-cleaning tool is connected.

Another advantage of the present invention is to provide a novel sewer-cleaning tool for attachment to a mobile vacuum cleaning tanker truck that provides a scoop that traps material too heavy for the vacuum portion of the mobile vacuum cleaning tanker truck to remove, and allows for removal of heavy debris by using a hydraulic tube lift mechanism associated with the mobile vacuum cleaning tanker truck.

A still further advantage of the present invention is to provide a novel sewer-cleaning tool that allows the draws water and debris from only one direction, thereby eliminating the inefficient removal of water from the downstream direction.

Although the present invention has been described in considerable detail and with reference to certain preferred versions, other versions are possible. For example, while a preferred version of the reinforcement assembly has been disclosed, some variation could be made without seriously degrading the performance of the sewer-cleaning tool. One such variation includes the structure of a single bar, welded to each attachment ear 63 and to the center sidewall 30. Therefore, the spirit and scope of the appended claims should not be limited to the description of the preferred versions disclosed.

In compliance with the U.S. patent laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A sewer-cleaning tool, for attachment to a pipe, the sewer-cleaning tool comprising:

(A) a sleeve;

(B) a scoop, bounded by a front edge, left and right side edges and a rear edge that is attached to a lower rim of the sleeve; and (C) a fence assembly comprising left and right fence segments, each fence segment comprising a porous mesh sheet defining a lower edge fastened to a respective one of the left and right side edges of the scoop and a rear edge fastened to the sleeve.

2. A sewer-cleaning tool, for attachment to a pipe, the sewer-cleaning tool comprising:

(A) a sleeve comprising an upper full cylinder defining left, right and rear adjustment slots and a lower half cylinder defining a debris inlet;

(B) a scoop, comprising:

(a) a main body bounded by a rounded front edge, straight left and right side edges and a rear edge;

(b) a slopping rear wall attached to the rear edge of the main body and to a lower rim of the lower half cylinder;

(c) a heal plate, carried by a lower surface of the main body;

(C) a fence assembly comprising left and right fence segments, each fence segment comprising;

(a) a porous mesh sheet defining a lower edge fastened to a respective one of the straight left and right side edges of the main body of the scoop and a rear edge fastened to the sleeve;

(b) a trim piece carried by an upper and front edge of the porous mesh sheet; and (c) an attachment ear, carried by an upper and forward location on the porous mesh sheet; and (D) a reinforcement assembly, comprising left and right rods, each rod connected at a first end to the left and right attachment ears, respectively, and a second end to upper and lower center nuts carried by a front sidewall of the sleeve.

* * * * *